(12) United States Patent
Bowen et al.

(10) Patent No.: US 6,843,237 B2
(45) Date of Patent: Jan. 18, 2005

(54) CNG FUEL STORAGE AND DELIVERY SYSTEMS FOR NATURAL GAS POWERED VEHICLES

(75) Inventors: Ronald R. Bowen, Magnolia, TX (US); Moses Minta, Sugar Land, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 0 days.

(21) Appl. No.: 10/303,299

(22) Filed: Nov. 25, 2002

(65) Prior Publication Data

US 2003/0098018 A1 May 29, 2003

Related U.S. Application Data

(60) Provisional application No. 60/333,584, filed on Nov. 27, 2001, and provisional application No. 60/342,204, filed on Dec. 19, 2001.

(51) Int. Cl.$^7$ .............................................. F02B 43/00
(52) U.S. Cl. ....................................................... 123/527
(58) Field of Search ................................ 123/494, 527, 123/557, 525, 27 GE, 3, 1 A, 529; 137/203, 204; 141/18, 2, 4, 11, 654, 336

(56) References Cited

U.S. PATENT DOCUMENTS

| 2,004,074 A | 6/1935 | Kiley |
| 2,763,397 A | 9/1956 | Rice |
| 2,795,937 A | 6/1957 | Sattler et al. |
| 2,940,268 A | 6/1960 | Morrison |
| 3,097,294 A | 7/1963 | Kubli et al. |

(List continued on next page.)

FOREIGN PATENT DOCUMENTS

| DE | 2039910 | 5/1972 |
| EP | 0633422 | 1/1995 |
| EP | 0661428 | 7/1995 |
| EP | 0767338 | 4/1997 |
| EP | 0810081 | 12/1997 |

(List continued on next page.)

OTHER PUBLICATIONS

Reference cited by Taiwan Patent Office in related patent application: Quarterly Journal of China Shipbuilding Corp., vol. 13, No. 4 (Oct. 1992) pp. 159–169 (with English translation of relevant portions as provided by Applicant's agent in Taiwan).

Reference cited by Taiwan Patent Office in related patent application: Journal of Mechanics, Monthly, 18$^{th}$ vol., 3$^{rd}$ periodical under section "Special Edition for Metal Material", Chapter "On line Accelerated cooling treatment for steel plate and the product thereby, Introduction of TMCP steel plate", pp. 254–260, (with English translation of relevant portions as provided by Applicant's agent in Taiwan).

(List continued on next page.)

*Primary Examiner*—Tony M. Argenbright
*Assistant Examiner*—Hyder Ali (57) ABSTRACT

Fuel storage and delivery systems for compressed natural gas are provided that are constructed from ultra-high strength, low alloy steels containing less than 2.5 wt % nickel and having a tensile strength greater than 900 MPa (130 ksi). A primary benefit is that systems of this invention have substantially lower weight than that of currently available steel-based systems. Consequently, the fuel efficiency of a CNG vehicle can be improved due to the lower weight of the system of this invention, or the driving range of the CNG vehicle can be improved by increased fuel storage for the same volume at an elevated pressure, or the load-carrying capacity of the CNG vehicle can be improved. Another primary benefit is that systems of this invention have a cost per unit strength substantially lower than that of currently available systems.

4 Claims, 3 Drawing Sheets

U.S. PATENT DOCUMENTS

| | | |
|---|---|---|
| 3,232,725 A | 2/1966 | Secord et al. |
| 3,298,805 A | 1/1967 | Secord et al. |
| 3,477,509 A | 11/1969 | Arendt |
| 3,535,210 A | 10/1970 | Linde et al. |
| 3,565,201 A | 2/1971 | Petsinger |
| 3,745,322 A | 7/1973 | Ito et al. |
| 3,773,500 A | 11/1973 | Kanazawa et al. |
| 3,853,611 A | 12/1974 | Godai et al. |
| 3,864,918 A | 2/1975 | Lorenz |
| 3,931,908 A | 1/1976 | Cheyney |
| 3,967,465 A | 7/1976 | Asselman et al. |
| 3,986,340 A | 10/1976 | Bivins, Jr. |
| 3,990,256 A | 11/1976 | May et al. |
| 4,024,720 A | 5/1977 | Dimentberg, deceased et al. |
| 4,033,135 A | 7/1977 | Mandrin |
| 4,068,113 A | 1/1978 | Godai et al. |
| 4,162,158 A | 7/1979 | Hwang et al. |
| 4,182,254 A | 1/1980 | Secord |
| 4,184,898 A | 1/1980 | Ouchi et al. |
| 4,210,445 A | 7/1980 | Kasamatsu et al. |
| 4,257,808 A | 3/1981 | Morris, Jr. et al. |
| 4,259,846 A | 4/1981 | Rudolphi et al. |
| 4,266,958 A | 5/1981 | Cummings |
| 4,300,598 A | 11/1981 | Royer et al. |
| 4,315,407 A | 2/1982 | Creed et al. |
| 4,374,478 A | 2/1983 | Secord, deceased et al. |
| 4,459,929 A | 7/1984 | Ffooks |
| 4,464,209 A | 8/1984 | Taira et al. |
| 4,572,748 A | 2/1986 | Suga et al. |
| 4,687,525 A | 8/1987 | Biniasz et al. |
| 4,776,900 A | 10/1988 | Yano et al. |
| 4,878,955 A | 11/1989 | Hoshino et al. |
| 5,118,221 A | 6/1992 | Copple |
| 5,127,230 A | 7/1992 | Neeser et al. |
| 5,183,198 A | 2/1993 | Tamehiro et al. |
| 5,183,633 A | 2/1993 | Thierry et al. |
| 5,199,266 A | 4/1993 | Johansen |
| 5,213,634 A | 5/1993 | DeArdo et al. |
| 5,228,295 A | 7/1993 | Gustafson |
| 5,287,987 A | 2/1994 | Gaiser |
| 5,325,673 A | 7/1994 | Durr et al. |
| 5,327,730 A | 7/1994 | Myers et al. |
| 5,330,031 A | 7/1994 | Hill et al. |
| 5,373,700 A | 12/1994 | McIntosh |
| 5,409,046 A * | 4/1995 | Swenson et al. ............... 141/11 |
| 5,421,162 A | 6/1995 | Gustafson et al. |
| 5,437,800 A | 8/1995 | White-Stevens |
| 5,441,234 A | 8/1995 | White et al. |
| 5,443,330 A | 8/1995 | Copple |
| 5,443,578 A | 8/1995 | Davis, Jr. |
| 5,447,391 A | 9/1995 | Gallaher et al. |
| 5,454,883 A | 10/1995 | Yoshie et al. |
| 5,458,258 A | 10/1995 | White et al. |
| 5,483,943 A * | 1/1996 | Peters ........................ 123/527 |
| 5,484,098 A | 1/1996 | Anttila et al. |
| 5,509,977 A | 4/1996 | Yano et al. |
| 5,529,089 A | 6/1996 | Hicks et al. |
| 5,531,842 A | 7/1996 | Koo et al. |
| 5,545,269 A | 8/1996 | Koo et al. |
| 5,545,270 A | 8/1996 | Koo et al. |
| 5,554,233 A | 9/1996 | Heitmann et al. |
| 5,566,712 A | 10/1996 | White et al. |
| 5,582,218 A | 12/1996 | Beale |
| 5,590,535 A | 1/1997 | Rhoades |
| 5,603,360 A | 2/1997 | Teel |
| 5,611,316 A | 3/1997 | Oshima et al. |
| 5,634,988 A | 6/1997 | Kurebayashi et al. |
| 5,653,826 A | 8/1997 | Koo et al. |
| 5,676,180 A | 10/1997 | Teel |
| 5,678,411 A | 10/1997 | Matsumura et al. |
| 5,683,206 A | 11/1997 | Copple |
| 5,755,895 A | 5/1998 | Tamehiro et al. |
| 5,762,119 A | 6/1998 | Platz et al. |
| 5,785,924 A | 7/1998 | Beguinot et al. |
| 5,787,920 A | 8/1998 | Krasnov |
| 5,798,004 A | 8/1998 | Tamehiro et al. |
| 5,820,102 A * | 10/1998 | Borland ...................... 251/144 |
| 5,876,521 A | 3/1999 | Koo et al. |
| 5,878,814 A | 3/1999 | Breivik et al. |
| 5,884,488 A | 3/1999 | Gram et al. |
| 5,887,567 A | 3/1999 | White et al. |
| 5,900,075 A | 5/1999 | Koo et al. |
| 5,908,141 A | 6/1999 | Teel |
| 5,919,415 A | 7/1999 | Pichard |
| 5,950,453 A | 9/1999 | Bowen et al. |
| 5,980,159 A | 11/1999 | Kazim |
| 6,047,747 A | 4/2000 | Bowen et al. |
| 6,058,713 A | 5/2000 | Bowen et al. |
| 6,066,212 A | 5/2000 | Koo et al. |
| 6,085,528 A | 7/2000 | Woodall et al. |
| 6,114,656 A | 9/2000 | Fairchild |
| 6,159,312 A | 12/2000 | Koo et al. |
| 6,203,631 B1 | 3/2001 | Bowen et al. |
| 6,212,891 B1 | 4/2001 | Minta et al. |
| 6,224,689 B1 | 5/2001 | Koo et al. |
| 6,228,183 B1 | 5/2001 | Bangaru et al. |
| 6,245,290 B1 | 6/2001 | Koo et al. |
| 6,248,191 B1 | 6/2001 | Luton et al. |
| 6,251,198 B1 | 6/2001 | Koo et al. |
| 6,254,698 B1 | 7/2001 | Koo et al. |
| 6,264,760 B1 | 7/2001 | Tamehiro et al. |
| 6,336,583 B1 | 1/2002 | Wang et al. |
| 6,481,751 B1 * | 11/2002 | Davis, Jr. et al. ............ 280/831 |

FOREIGN PATENT DOCUMENTS

| | | |
|---|---|---|
| EP | 0837280 | 4/1998 |
| GB | 1522609 | 8/1978 |
| GB | 2345729 | 7/2000 |
| JP | 55-107763 | 8/1980 |
| JP | 57-134514 | 8/1982 |
| JP | 58-52423 | 3/1983 |
| JP | 59013055 | 1/1984 |
| JP | 63062843 | 3/1988 |
| JP | 02250941 | 10/1990 |
| JP | 07126797 | 5/1995 |
| JP | 7-292416 | 11/1995 |
| JP | 7-331328 | 12/1995 |
| JP | 8-104922 | 4/1996 |
| JP | H8-176659 | 7/1996 |
| JP | H8-295982 | 11/1996 |
| JP | 8-311548 | 11/1996 |
| JP | 8-311549 | 11/1996 |
| JP | 8-311550 | 11/1996 |
| JP | 9-31536 | 2/1997 |
| JP | 9-41074 | 2/1997 |
| JP | 09235617 | 9/1997 |
| WO | WO 95/32874 | 12/1995 |
| WO | WO 97/27105 | 7/1997 |
| WO | WO 99/32672 | 7/1999 |
| WO | WO 99/47869 | 9/1999 |
| WO | WO 00/39352 | 7/2000 |
| WO | WO 01/63974 | 8/2001 |

OTHER PUBLICATIONS

Reference cited by Taiwan Patent Office in related patent application: "Structure Controlling and Toughening of Steel Material", Monthly Journal of Mechanics, vol. 18, No. 3 (1992) pp. 227–235 (English translation of drawing captions and paragraph marked A on p. 228).3

Reference cited by Taiwan Patent Office in related patent application: "Electronic Welding Operation Handbook Part 1", 1994, pp. 12–33–12–41 (English translation of relevant portions as provided by Applicant's agent in Taiwan).

Reference cited by Taiwan Patent Office in related patent application: "Welding Handbook vol. 2", 1993, pp. 190–195 (English translation of relevant portions as provided by Applicant's agent in Taiwan).

K. E. Dorschu et al, "Development of a Filler Metal for a High–Toughness Alloy Plate Steel with a Minimum Yield Strength of 140 ksi", The Welding Journal, Dec. 1964, pp. 564s–575s.

G. G. Saunders, "Effect of Major Alloying Elements on the Toughness of High Strength Weld Metal", Welding Research International, vol. 7, No. 2, 1977, pp. 91–118.

S. G. Ladkany, "Composite Aluminum–Fiberglass Epoxy Pressure Vessels for Transportation of LNG at Intermediate Temperatures", Published in *Advances in Cryogenic Engineering Materials*, vol. 28, (Proceeding of the 4$^{th}$ International Cryogenic Materials Conference), San Diego, CA, USA, Aug. 10–14, 1981, pp. 905–913.

Gary W. Van Tassel, "An Economic System for the Liquefaction, Transportation and Regas of Natural Gas Using Surplus LNG Carriers", *The Society of Naval Architects and Marine Engineers*, 1984, pp. 17–1 through 17–7.

Roger Ffooks, "Natural Gas by Sea, The Development of a New Technology", published 1983 (second edition) by Witherby & Co. Ltd., Chapter 14, especially pp. 162–164 and 175–176 (month of publication not provided).

R. J. Broeker, "A New Process for the Transportation of Natural Gas", International LNG Conference (Apr. 1968), Chicago, Illinois, Session No. 5, Paper 30, pp. 1–11.

C. P. Bennett, "Marine Transportation of LNG at Intermediate Temperature", CME, pp. 63–64, Mar. 1979.

E. K. Faridany, et al., "The Ocean Phoenix Pressure–LNG System", Gastech 1976, (month of publication not provided) pp. 267–280.

E. K. M. Faridany, et al., "A Pressure LNG System", European Offshore Petroleum Conference & Exhibition, Oct. 21–24, 1980, pp. 245–254.

R. J. Broeker "CNG and MLG–New Natural Gas Transportation Processes", *American Gas Journal* (Jul. 1969) pp. 45, 48 and 50.

Prof. E. Fluggen and Dr. I. H. Backhause, "Pressurised LNG—and the Utilisation of Small Gas Fields", Gastech 78, LNG/LPG Conference Proceedings, Monte Carlo (Nov. 7–10, 1978) pp. 195–204.

N. C. Fawley, "High Speed Collision and Severe Abuse Testing of Composite Reinforced Aluminum CNG Vehicle Fuel Cylinders", Nonpetroleum Vehicular Fuels IV Symposium, Arlington, Virginia, Apr. 16–18, 1984, pp. 145–180.

K. E. Starling, et al., "Method for Improving Natural Gas Energy Density at Ambient Temperatures", *Energy & Fuels*, vol. 9, No. 6, 1995, pp. 1062–1064.

N. C. Fawley, "Finally: A Lightweight CNG System", School Bus Fleet, Apr.–May 1984, pp. 36–39.

J. F. Hawkins, "High Pressure Tanks for Alternative Fueled Vehicles", SAE, International Congress & Exposition, Detroit, Michigan, Feb. 28–Mar. 4, 1983, pp. 1–4.

"New CNG Cylinders Prompt Conversions to NGVs", 1984, one page.

R. Harrison, et al., "Impact on Street Pavements of Buses Fueled by Compressed Natural Gas", *Transportation Research Record No. 1475*, National Research Council, Washington, DC, 1995, pp. 20–25.

D. B. Tiller, et al., "Development of Compressed Natural Gas Storage Systems for Transit Bus Applications", Lincoln, NE, Oct. 23, 2000, pp. 138–147.

R. Dunbar and W. Ellison, "Gas–Fired Natural Gas Liquefier for Vehicle Fuel", *Advances in Cryogenic Engineering*, vol. 35, New York, NY, 1990, pp. 1791–1796.

G. S. Bhuyan, "Leak–Before–Break and Fatigue Crack Growth Analysis of All–Steel On–Board Natural Gas Cylinders", Fracture Mechanics 23$^{rd}$ Symposium, Philadelphia, PA, 1993, pp. 498–511.

J. J. Wozniak, et al., "Advanced Natural Gas Vehicle Development", *Johns Hopkins APL Technical Digest*, vol. 16, No. 1 (1995), pp. 95–100.

A. R. Cardenas, et al., "Is There a Hope for Adsorbed Natural Gas (ANG) Vehicles?", SPE Gas Technology Conference, Calgary, Alberta, Canada, Apr. 28–May 1, 1996, pp. 151–158.

J. Wegrzyn et al., "Adsorbent Storage of Natural Gas", *Applied Energy*, vol. 55, No. 2, 1996, pp. 71–83.

Dingyi Yang and R. Harrison, *Impact of Compressed Natural Gas Fueled Buses on Street Pavements*, Center for Transportation Research, University of Texas at Austin, Jul., 1995, pp. 1–141.

* cited by examiner

CNG FUEL STORAGE AND DELIVERY SYSTEMS FOR NATURAL GAS POWERED VEHICLES

This application claims the benefit of U.S. Provisional Application No. 60/333,584, filed 27 Nov. 2001, and the benefit of U.S. Provisional Application No. 60/342,204, filed 19 Dec. 2001.

FIELD OF THE INVENTION

This invention relates to fuel storage and delivery systems for storing compressed natural gas (CNG) fuel and delivering CNG fuel on demand for combustion in an engine. More particularly, the present invention relates to such fuel storage and delivery systems having fuel storage containers that are constructed from ultra-high strength, low alloy steels and that have a cost per unit strength substantially lower than that of currently available fuel storage containers constructed from ultra-high strength, low alloy steels. Even more particularly, this invention relates to such fuel storage and delivery systems having fuel storage containers that are constructed from ultra-high strength, low alloy steels containing less than 2.5 wt % nickel and having a tensile strength greater than 900 MPa (130 ksi). While not limited thereto, the present invention is especially useful for automobiles, buses, trucks and other vehicles with engines designed to operate through combustion of natural gas.

BACKGROUND OF THE INVENTION

Various terms are defined in the following specification. For convenience, a Glossary of terms is provided herein, immediately preceding the claims.

Laws such as the Clean Air Act (1990) and the Energy Policy Act (1992), which mandate the purchase of alternative fueled vehicles (AFVs), have spurred several serious business initiatives to develop natural gas vehicles (NGVs). Although these laws were motivated by air quality issues, they have created economic incentives that have spurred real activity in implementing NGVs. NGVs currently hold the most competitive potential alternative to gasoline-powered vehicles because of the inherent clean-burning characteristics of natural gas.

Compressed natural gas (CNG) technology is a candidate for the implementation of NGV-type AFVs. In current CNG technology, gaseous (natural gas) fuel is stored at very high pressures of about 20.7 MPa to 24.8 MPa (3000–3600 psia) and typically in containers made from X-65 steels, aluminum, or from carbon or glass fiber composites. Many publications and issued patents discuss CNG technologies. For example, see "Finally: A Lightweight CNG System", published in the April/May 1984 edition of *School Bus Fleet*, WO 95/32874, U.S. Pat. Nos. 5,330,031, and 5,458,258. Despite these publications and issued patents, there are major shortcomings of current CNG technology that have limited its successful deployment: short vehicle driving range (due to low energy storage density of CNG); the weight and high cost of on-board (and typically non-conformable) fuel storage containers; low fuel efficiency due to the weight of fuel storage containers; and low load-carrying capacity of the vehicle, corresponding to the incremental weight of the fuel storage tanks.

A need exists for fuel storage and delivery systems capable of economically storing CNG fuel and delivering CNG fuel on demand for combustion in an engine. Further, a need exists for such fuel storage and delivery systems that allow for longer vehicle driving ranges, as well as lighter and less expensive storage containers than are provided by current CNG technologies.

Consequently, the primary object of the present invention is to provide improved fuel storage and delivery systems suitable for storing CNG fuel and delivering CNG fuel on demand for combustion in an engine.

SUMMARY OF THE INVENTION

Consistent with the above-stated objects of the present invention, fuel storage and delivery systems are provided for storing compressed natural gas (CNG) fuel at a pressure of about 20.7 MPa to 37.5 MPa (3000 psia–5440 psia), preferably at a pressure of about 20.7 MPa to 24.8 MPa (3000 psia–3600 psia), and delivering CNG fuel on demand for combustion in an engine. The fuel storage and delivery systems of this invention have fuel storage containers and other system components that have a cost per unit strength substantially lower than that of currently available CNG fuel storage and delivery systems and are constructed from steels having a tensile strength greater than 450 MPa (65 ksi). Preferably the fuel storage containers and other system components are constructed from materials comprising an ultra-high strength, low alloy steel containing less than 2.5 wt % nickel. Preferably the steel has an ultra-high strength, e.g., tensile strength (see Glossary) greater than 900 MPa (130 ksi) and/or yield strength greater than 830 MPa (120 ksi). Other containers and systems constructed from materials comprising such ultra-high strength, low alloy steels are also provided.

DESCRIPTION OF THE DRAWINGS

The advantages of the present invention will be better understood by referring to the following detailed description and the attached drawings in which.

While the invention will be described in connection with its preferred embodiments, it will be understood that the invention is not limited thereto. On the contrary, the invention is intended to cover all alternatives, modifications, and equivalents which may be included within the spirit and scope of the present disclosure, as defined by the appended claims.

DETAILED DESCRIPTION OF THE INVENTION

The present invention relates to fuel storage and delivery systems, and individual components thereof, for storing CNG fuel and delivering CNG fuel on demand for combustion in a vehicle engine. Fuel storage and delivery systems are provided for storing CNG fuel at pressures of about 20.7 MPa to 37.5 MPa (3000 psia–5440 psia), preferably at pressures of about 20.7 MPa to 24.8 MPa (3000 psia–3600 psia), and delivering CNG fuel on demand for combustion in an engine, wherein the fuel storage and delivery systems have fuel storage containers and other components that have a cost per unit strength substantially lower than that of currently available CNG fuel storage and delivery systems and are constructed from materials comprising an ultra-high strength, low alloy steel containing less than 2.5 wt % nickel and having a tensile strength greater than 900 MPa (130 ksi).

In particular, a fuel storage container suitable for use in a fuel storage and delivery system for storing compressed natural gas fuel at pressures of about 20.7 MPa to 37.5 MPa (3000 psia–5440 psia) and delivering compressed natural gas fuel on demand for combustion in an engine is provided, wherein said fuel storage container is constructed by joining together a plurality of discrete plates of materials comprising an ultra-high strength, low alloy steel containing less than 2.5 wt % nickel and having a tensile strength of at least about 900 MPa (130 ksi), and wherein joints between said discrete plates have adequate strength and toughness at said pressure conditions to contain said compressed natural gas. The fuel storage container of this invention preferably has joints having a strength of at least about 90% of the tensile strength of said ultra-high strength, low alloy steel. Further, the fuel storage container of this invention preferably is suitable for use at temperatures down to −40° C. (−40° F.). In one embodiment, the fuel storage container of this invention has joints that are formed by a weld metal comprising iron and the following alloying elements in the weight percents indicated: about 0.04 wt % to about 0.08 wt % carbon; about 1.0 wt % to about 2.0 wt % manganese; about 0.2 wt % to about 0.7 wt % silicon; about 0.30 wt % to 0.80 wt % molybdenum; about 2.3 wt % to about 3.5 wt % nickel; about 0.0175 wt % to about 0.0400 wt % oxygen; and at least one additive selected from the group consisting of (i) up to about 0.04 wt % zirconium, and (ii) up to about 0.02 wt % titanium; wherein the microstructure of said weld metal comprises from about 5 vol % to about 45 vol % acicular ferrite and at least about 50 vol % lath martensite, degenerate upper bainite, lower bainite, granular bainite, or mixtures thereof. Also provided is a system comprising: (a) at least one fuel storage container for storing compressed natural gas fuel at pressures of about 20.7 MPa to 37.5 MPa (3000 psia–5440 psia), wherein said fuel storage container is constructed by joining together a plurality of discrete plates of materials comprising an ultra-high strength, low alloy steel containing less than 2.5 wt % nickel and having a tensile strength of at least about 900 MPa (130 ksi), and wherein joints between said discrete plates have adequate strength and toughness at said pressure conditions to contain said compressed natural gas; and (b) facilities for delivering compressed natural gas fuel on demand for combustion in an engine. Also provided is a fuel storage and delivery system comprising: (a) at least one fuel storage container for storing compressed natural gas fuel at pressures of about 20.7 MPa to 37.5 MPa (3000 psia–5440 psia), wherein said fuel storage container is constructed by joining together a plurality of discrete plates of materials comprising an ultra-high strength, low alloy steel containing less than 2.5 wt % nickel and having a tensile strength of at least about 900 MPa (130 ksi), and wherein joints between said discrete plates have adequate strength and toughness at said pressure conditions to contain said compressed natural gas; (b) a fill and vent valve for allowing transfer of said compressed natural gas fuel between a refueling station and said fuel storage container; (c) a reducer line for allowing flow of compressed natural gas fuel from said fuel storage tank to a pressure reducer; (d) a fuel line for allowing flow of said reduced pressure compressed natural gas fuel from said reducer to said engine; and a fuel regulator for regulating flow of said reduced pressure compressed natural gas fuel from said reducer to said engine, such that said fuel storage and delivery system is adapted for storing said compressed natural gas fuel at pressures of about 20.7 MPa to 37.5 MPa (3000 psia–5440 psia) and delivering said reduced pressure compressed natural gas fuel on demand for combustion in an engine. Also provided is a method comprising: (a) placing compressed natural gas fuel at pressures of about 20.7 MPa to 37.5 MPa (3000 psia–5440 psia) into at least one fuel storage container, wherein said at least one fuel storage container is constructed by joining together a plurality of discrete plates of materials comprising an ultra-high strength, low alloy steel containing less than 2.5 wt % nickel and having a tensile strength of at least about 900 MPa (130 ksi), and wherein joints between said discrete plates have adequate strength and toughness at said pressure conditions to contain said compressed natural gas; (b) delivering compressed natural gas fuel on demand for combustion in an engine.

Another advantage of this invention is that fuel storage containers and other components of systems according to this invention have a weight per strength ratio of about half or less than those of currently available steel-based CNG fuel storage and delivery systems. Thus systems of this invention provide the strength needed to contain high pressure CNG at a much lower weight than current steel-based systems. The advantages this provides can be explained by an example. Consider a fleet of trucks that have very large refrigerated storage compartments, are fueled by current CNG fuel storage and delivery systems, and are used for delivering groceries from a distribution center to numerous retail stores on a daily basis. Replacement of the current fuel storage and delivery systems with the systems of this invention could enable each truck to either (i) maintain its current fuel volume and fuel efficiency, but increase its grocery load by an amount equal to the weight difference between the current system and the system of this invention; or (ii) maintain its current fuel volume and grocery load, but increase its fuel efficiency due to the lower weight of the system of this invention; or (iii) reduce its fuel volume, but increase its grocery load while maintaining its current fuel efficiency; or (iv) increase the current fuel volume and maintain the current fuel efficiency and grocery load by storing the fuel at an elevated pressure. Other combinations of the foregoing options are possible, as well as other options not mentioned.

Steels for Construction of Fuel Storage and Delivery System Containers and Other Components Any ultra-high strength, low alloy steel containing less than 2.5 wt % nickel and having a tensile strength greater than 900 MPa (130 ksi) may be used for constructing the fuel storage containers and other components of systems of this invention. An example steel for use in the present invention, without thereby limiting the invention, is a weldable, ultra-high strength, low alloy steel containing less than 2.5 wt % nickel and having a tensile strength greater than 900 MPa (130 ksi). Another example steel for use in the present invention, without thereby limiting the invention, is a weldable, ultra-high strength, low alloy steel containing less than about 1 wt % nickel and having a tensile strength greater than 900 MPa (130 ksi). Preferably these example steels have adequate fracture toughness at temperatures down to −40° C. (−40° F.) in both the base plate and in the HAZ when welded, to allow operation of CNG vehicles in arctic environments.

Recent advances in steel making technology have made possible the manufacture of new, ultra-high strength, low alloy steels with excellent low temperature toughness. These ultra-high strength, low alloy steels also have improved toughness in both the base steel and in the heat affected zone (HAZ) when welded over standard commercially available high strength, low alloy steels. The improved steels are described in U.S. Pat. No. 6,245,290 entitled "HIGH-TENSILE-STRENGTH STEEL AND METHOD OF MANUFACTURING THE SAME", and in corresponding International Publication Number WO 98/38345; in U.S. Pat. No. 6,228,183 entitled "ULTRA HIGH STRENGTH, WELDABLE, BORON-CONTAINING STEELS WITH SUPERIOR TOUGHNESS", and in corresponding International Publication Number WO 99/05336; in U.S. Pat. No. 6,224,689 entitled "ULTRA-HIGH STRENGTH, WELDABLE, ESSENTIALLY BORON-FREE STEELS WITH SUPERIOR TOUGHNESS", and in corresponding International Publication WO 99/05334; in U.S. Pat. No. 6,248,191 entitled "METHOD FOR PRODUCING ULTRA-HIGH STRENGTH, WELDABLE STEELS WITH SUPERIOR TOUGHNESS", and in corresponding International Publication WO 99/05328; and in U.S. Pat. No. 6,264,760 entitled "ULTRA-HIGH STRENGTH, WELDABLE STEELS WITH EXCELLENT ULTRA-LOW TEMPERATURE TOUGHNESS", and in corresponding International Publication WO 99/05335 (collectively, the "Steel Patent Applications").

The new steels described in the Steel Patent Applications, and further described in the example below, are especially suitable for constructing the fuel storage containers and other components of this invention in that the steels have the following characteristics, preferably for steel plate thicknesses of about 2.5 cm (1 inch) and greater: (i) tensile strength greater than 900 MPa (130 ksi), more preferably greater than about 930 MPa (135 ksi); (ii) good weldability; (iii) substantially uniform microstructure; and (iv) adequate fracture toughness for use at temperatures down to −40° C. (−40° F.).

Other suitable steels are described in International Publication Number WO 99/32672, entitled "ULTRA-HIGH STRENGTH STEELS WITH EXCELLENT CRYOGENIC TEMPERATURE TOUGHNESS"; in U.S. Pat. No. 6,251,198 and International Publication Number WO 99/32670, entitled "ULTRA-HIGH STRENGTH AUSAGED STEELS WITH EXCELLENT CRYOGENIC TEMPERATURE TOUGHNESS"; in U.S. Pat. No. 6,066,212 and International Publication Number WO 99/32671, entitled "ULTRA-HIGH STRENGTH DUAL PHASE STEELS WITH EXCELLENT CRYOGENIC TEMPERATURE TOUGHNESS"; in PCT International Application Number PCT/US99/29802, entitled "ULTRA-HIGH STRENGTH STEELS WITH EXCELLENT CRYOGENIC TEMPERATURE TOUGHNESS"; in U.S. Pat. No. 6,254,698 and PCT International Application Number PCT/US99/30055, entitled "ULTRA-HIGH STRENGTH AUSAGED STEELS WITH EXCELLENT CRYOGENIC TEMPERATURE TOUGHNESS"; and in U.S. Pat. No. 6,159,312 and PCT International Application Number PCT/US99/29804, entitled "ULTRA-HIGH STRENGTH TRIPLE PHASE STEELS WITH EXCELLENT CRYOGENIC TEMPERATURE TOUGHNESS" (collectively, the "Additional Steel Patents and Patent Applications"). The steels described in the Additional Steel Patents and Patent Applications are especially suitable for cold temperature applications, such as in arctic environments, in that the steels have the following characteristics for steel plate thicknesses of about 2.5 cm (1 inch) and greater: (i) DBTT lower than about −73° C. (−100° F.) in the base steel and in the weld heat-affected zone (HAZ), (ii) tensile strength greater than about 830 MPa (120 ksi), preferably greater than about 860 MPa (125 ksi), and more preferably greater than about 900 MPa (130 ksi), (iii) superior weldability, (iv) substantially uniform through-thickness microstructure and properties, and (v) improved toughness over standard, commercially available, high-strength, low-alloy steels. These steels can have a tensile strength of greater than about 930 MPa (135 ksi), or greater than about 965 MPa (140 ksi), or greater than about 1000 MPa (145 ksi).

STEEL EXAMPLE

As discussed above, U.S. Pat. No. 6,248,191 entitled "METHOD FOR PRODUCING ULTRA-HIGH STRENGTH, WELDABLE STEELS WITH SUPERIOR TOUGHNESS", and corresponding International Publication WO 99/05328, each provide a description of steels suitable for use in the present invention. A method is provided for preparing an ultra-high strength steel plate. A steel slab is processed by: heating the slab to a substantially uniform temperature sufficient to dissolve substantially all carbides and carbonitrides of vanadium and niobium, preferably in the range of about 1000° C. to about 1250° C. (about 1832° F. to about 2282° F.), and more preferably in the range of about 1050° C. to about 1150° C. (about 1922° F. to about 2102° F.); a first hot rolling of the slab to a reduction of preferably about 20% to about 60% (in thickness) to form plate in one or more passes within a first temperature range in which austenite recrystallizes; a second hot rolling to a reduction of preferably about 40% to about 80% (in thickness) in one or more passes within a second temperature range, somewhat lower than the first temperature range, at which austenite does not recrystallize and above the $Ar_3$ transformation point; hardening the rolled plate by quenching at a rate of at least about 10° C./second (18° F./second), preferably at least about 20° C./second (36° F./second), more preferably at least about 30° C./second (54° F./second), and even more preferably at least about 35° C./second (63° F./second), from a temperature no lower than the $Ar_3$ transformation point to a Quench Stop Temperature (QST) at least as low as the $Ar_1$ transformation point, preferably in the range of about 550° C. to about 150° C. (about 1022° F. to about 302° F.), and more preferably in the range of about 500° C. to about 150° C. (about 932° F. to about 302° F.), and stopping the quenching and allowing the steel plate to air cool to ambient temperature, so as to facilitate completion of transformation of the steel to predominantly fine-grained lower bainite, fine-grained lath martensite, or mixtures thereof. As is understood by those skilled in the art, as used herein "percent reduction in thickness" refers to percent reduction in the thickness of the steel slab or plate prior to the reduction referenced. For purposes of example only, without thereby limiting this invention, a steel slab of about 25.4 cm (10 inches) may be reduced about 50% (a 50 percent reduction), in a first temperature range, to a thickness of about 12.7 cm (5 inches) then reduced about 80% (an 80 percent reduction), in a second temperature range, to a thickness of about 2.54 cm (1 inch).

The preferred steel product has a substantially uniform microstructure preferably comprising predominantly fine-grained lower bainite, fine-grained lath martensite, or mixtures thereof. Preferably, the fine-grained lath martensite comprises auto-tempered fine-grained lath martensite. As used in describing the present invention, and in the claims, "predominantly" means at least about 50 volume percent. The remainder of the microstructure can comprise additional fine-grained lower bainite, additional fine-grained lath martensite, upper bainite, or ferrite. More preferably, the microstructure comprises at least about 60 volume percent to about 80 volume percent fine-grained lower bainite, fine-grained lath martensite, or mixtures thereof. Even more preferably, the microstructure comprises at least about 90 volume percent fine-grained lower bainite, fine-grained lath martensite, or mixtures thereof.

Both the lower bainite and the lath martensite may be additionally hardened by precipitates of the carbides or carbonitrides of vanadium, niobium and molybdenum. These precipitates, especially those containing vanadium, can assist in minimizing HAZ softening, likely by preventing any substantial reduction of dislocation density in regions heated to temperatures no higher than the $Ac_1$ transformation point or by inducing precipitation hardening in regions heated to temperatures above the $Ac_1$ transformation point, or both.

The steel plate of this example is manufactured by preparing a steel slab in a customary fashion and, in one embodiment, comprising iron and the following alloying elements in the weight percents indicated:

0.03–0.10% carbon (C), preferably 0.05–0.09% C
0–0.6% silicon (Si)
1.6–2.1% manganese (Mn)
0–1.0% copper (Cu)
0–1.0% nickel (Ni), preferably 0.2 to 1.0% Ni
0.01–0.10% niobium (Nb), preferably 0.03–0.06% Nb
0.01–0.10% vanadium (V), preferably 0.03–0.08% V
0.3–0.6% molybdenum (Mo)
0–1.0% chromium (Cr)
0.005–0.03% titanium (Ti), preferably 0.015–0.02% Ti
0–0.06% aluminum (Al), preferably 0.001–0.06% Al
0–0.006% calcium (Ca)
0–0.02% Rare Earth Metals (REM)
0–0.006% magnesium (Mg)
and further characterized by:
Ceq≦0.7, and
Pcm≦0.35, Alternatively, the chemistry set forth above is modified and includes 0.0005–0.0020 wt % boron (B), preferably 0.0008–0.0012 wt % B, and the Mo content is 0.2–0.5 wt %.

For essentially boron-free steels of this invention, Ceq is preferably greater than about 0.5 and less than about 0.7. For boron-containing steels of this invention, Ceq is preferably greater than about 0.3 and less than about 0.7.

Additionally, the well-known impurities nitrogen (N), phosphorous (P), and sulfur (S) are preferably minimized in the steel, even though some N is desired, as explained below, for providing grain growth-inhibiting titanium nitride particles. Preferably, the N concentration is about 0.001 to about 0.006 wt %, the S concentration no more than about 0.005 wt %, more preferably no more than about 0.002 wt %, and the P concentration no more than about 0.015 wt %. In this chemistry the steel either is essentially boron-free in that there is no added boron, and the boron concentration is preferably less than about 3 ppm, more preferably less than about 1 ppm, or the steel contains added boron as stated above.

A preferred method for producing this ultra-high strength steel having a microstructure comprising predominantly fine-grained lower bainite, fine-grained lath martensite, or mixtures thereof, comprises heating a steel slab to a temperature sufficient to dissolve substantially all carbides and carbonitrides of vanadium and niobium; reducing the slab to form plate in one or more hot rolling passes in a first temperature range in which austenite recrystallizes; further reducing the plate in one or more hot rolling passes in a second temperature range below the $T_{nr}$ temperature, i.e., the temperature below which austenite does not recrystallize, and above the $Ar_3$ transformation point, i.e., the temperature at which austenite begins to transform to ferrite during cooling; quenching the finished rolled plate to a temperature at least as low as the $Ar_1$ transformation point, i.e., the temperature at which transformation of austenite to ferrite or to ferrite plus cementite is completed during cooling, preferably to a temperature between about 550° C. and about 150° C. (1022° F.–302° F.), and more preferably to a temperature between about 500° C. and about 150° C. (932° F.–302° F.); stopping the quenching; and air cooling the quenched plate to ambient temperature.

Other suitable steels for use in connection with the present invention are described in other publications that describe ultra-high strength, low alloy steels containing less than about 1 wt % nickel, having tensile strengths greater than 900 MPa (130 ksi), and having adequate fracture toughness for use at temperatures down to –40° C. (–40° F.). For example, such steels are described in PCT International Publication Number WO 96/23909 having a PCT Publication date of 8 Aug. 1996 (such steels preferably having a copper content of 0.1 wt % to 1.2 wt %), and in PCT International Publication Number WO 96/23083 having a PCT Publication date of 1 Aug. 1996.

For any of the above-referenced steels, as is understood by those skilled in the art, the $T_{nr}$ temperature depends on the chemistry of the steel, and more particularly, on the slab heating temperature before rolling, the carbon concentration, the niobium concentration and the amount of reduction given in the rolling passes. Persons skilled in the art may determine this temperature for each steel composition either by experiment or by model calculation. Likewise, the $Ac_1$, $Ar_1$, and $Ar_3$ transformation points referenced herein may be determined by persons skilled in the art for each steel composition either by experiment or by model calculation.

For any of the above-referenced steels, as is understood by those skilled in the art, except for the slab heating temperature before rolling, which applies to substantially the entire slab, subsequent temperatures referenced in describing the processing methods of this invention are temperatures measured at the surface of the steel. The surface temperature of steel can be measured by use of an optical pyrometer, for example, or by any other device suitable for measuring the surface temperature of steel. The cooling rates referred to herein are those at the center, or substantially at the center, of the plate thickness; and the Quench Stop Temperature (QST) is the highest, or substantially the highest, temperature reached at the surface of the plate, after quenching is stopped, because of heat transmitted from the mid-thickness of the plate. For example, during processing of experimental heats of a steel composition according to the examples provided herein, a thermocouple is placed at the center, or substantially at the center, of the steel plate thickness for center temperature measurement, while the surface temperature is measured by use of an optical pyrometer. A correlation between center temperature and surface temperature is developed for use during subsequent processing of the same, or substantially the same, steel composition, such that center temperature may be determined via direct measurement of surface temperature. Also, the required temperature and flow rate of the quenching fluid to accomplish the desired accelerated cooling rate may be determined by one skilled in the art by reference to standard industry publications.

A person of skill in the art has the requisite knowledge and skill to use the information provided herein to produce ultra-high strength, low alloy steel plates having suitable high strength for use in constructing the fuel storage containers and other components of the present invention. Additionally, a person of skill in the art has the requisite knowledge and skill to use the information provided herein to produce ultra-high strength, low alloy steel plates having the required combinations of strength and fracture toughness for use in arctic environments. Other suitable steels may exist or be developed hereafter. All such steels are within the scope of this invention.

Joining Methods for Construction of Fuel Storage and Delivery System Containers and other Components In order to construct the fuel storage containers and other components of the present invention, a suitable method of joining the steel plates is required. Any joining method that will provide joints or seams with adequate strength and toughness for the present invention, as discussed above, is considered to be suitable. Preferably, a welding method suitable for providing adequate strength to contain the CNG is used to construct the fuel storage containers and other components of systems of this invention. Such a welding method preferably includes a suitable consumable wire, a suitable consumable gas, a suitable welding process, and a suitable welding procedure.

Suitable weld metals for use in joining materials comprising the steels described herein, and methods for producing such weld metals, are described in co-pending U.S. provisional patent application entitled "WELD METALS WITH SUPERIOR LOW TEMPERATURE TOUGHNESS FOR JOINING HIGH STRENGTH, LOW ALLOY STEELS", which has a priority date of 7 Aug. 2000 and is identified by the United States Patent and Trademark Office as application Ser. No. 09/920,894 (the "Weld Metal Application"). The Weld Metal Application is hereby incorporated herein by reference. As described in the Weld Metal Application, suitable weld metals comprise iron, about 0.04 wt % to about 0.08 wt % carbon, about 1.0 wt % to about 2.0 wt % manganese, about 0.2 wt % to about 0.7 wt % silicon, about 0.30 wt % to 0.80 wt % molybdenum, about 2.3 wt % to about 3.5 wt % nickel, about 0.0175 wt % to about 0.0400 wt % oxygen, and at least one additive selected from the group consisting of up to about 0.04 wt % zirconium and up to about 0.02 wt % titanium. Suitable weld metals can also comprise less than about 0.01 wt % phosphorus, less than about 0.01 wt % sulfur, up to about 0.03 wt % aluminum, and less than about 0.020 wt % nitrogen. Additionally, the weld metals can comprise at least one additive selected from the group consisting of up to about 0.60 wt % chromium, up to about 0.60 wt % copper, up to about 0.040 wt % vanadium, and up to about 0.0012 wt % boron. The microstructure of suitable weld metals comprises from about 5 vol % to about 45 vol % acicular ferrite and at least about 50 vol % lath martensite, degenerate upper bainite, lower bainite, granular bainite, or mixtures thereof. These weld metals have a suitable combination of high strength and superior low temperature toughness provided by the presence, morphology, and quantity of a hard constituent, such as lath martensite, and a relatively soft phase, acicular ferrite, in the weld metal microstructure. Some embodiments comprise from about 10 vol % to about 45 vol % acicular ferrite. Acicular ferrite is a type of ferrite well known to those skilled in the art that is commonly associated with steel weld metals that produce yield strengths less than about 690 MPa (100 ksi) and is known to have good toughness properties. The superior toughness of these weld metals results primarily from a relatively low carbon content, small grain size, finely distributed acicular ferrite, and an oxide inclusion design that ensures a fine distribution of small inclusion particles in the weld metal microstructure. The preferred welding method for producing these weld metals is gas metal arc welding (GMAW), and even more preferred is pulsed GMAW welding. The chemistry of these weld metals is best suited for relatively low heat input welding. More particularly, the chemistry is designed to give the desired combination of strength and toughness when welded with heat inputs in the range of about 0.3 kJ/mm (7.6 kJ/inch) to about 2.5 kJ/mm (63 kJ/inch). More preferably, the upper limit of this heat input range is about 1.5 kJ/mm (38 kJ/inch). The shielding gas composition for the preferred welding technique contains greater than about 50 vol % argon (Ar), and more preferably greater than 75 vol % Ar, with additions of carbon dioxide ($CO_2$), and/or oxygen, and/or helium. A preferred gas composition is a mixture of Ar and $CO_2$ comprising in the range of about 80 vol % to about 90 vol % Ar and about 10 vol % to about 20 vol % $CO_2$. An even more preferred gas composition includes helium (He) additions of up to about 25 vol %. The helium addition produces a more fluid weld pool, better wetting into the sidewall, and less "crowning" of the weld bead. Crowning refers to a convex weld bead surface profile and this can be particularly pronounced during overhead welding. In the case of a He-containing gas, a $CO_2$ content of at least about 5 vol % would be used with the remainder of the gas mixture being argon. Higher Ar and He contents may also be used.

When steels as described in the Additional Steel Patents and Patent Applications are used to construct fuel storage containers and other components of systems of this invention: both gas metal arc welding (GMAW) and tungsten inert gas (TIG) welding, which are both well known in the steel fabrication industry, can be used to join the steel plates, provided that a suitable consumable wire-gas combination is used. In a first example welding method, the gas metal arc welding (GMAW) process is used to produce a weld metal chemistry comprising iron and about 0.07 wt % carbon, about 2.05 wt % manganese, about 0.32 wt % silicon, about 2.20 wt % nickel, about 0.45 wt % chromium, about 0.56 wt % molybdenum, less than about 110 ppm phosphorous, and less than about 50 ppm sulfur. The weld is made on a steel, such as any of the above-described steels, using an argon-based shielding gas with less than about 1 wt % oxygen. The welding heat input is in the range of about 0.3 kJ/mm to about 1.5 kJ/mm (7.6 kJ/inch to 38 kJ/inch). Welding by this method provides a weldment (see Glossary) having a tensile strength greater than about 900 MPa (130 ksi), preferably greater than about 930 MPa (135 ksi), more preferably greater than about 965 MPa (140 ksi), and even more preferably at least about 1000 MPa (145 ksi). Further, welding by this method provides a weld metal with a DBTT below about −73° C. (−100° F.), preferably below about −96° C. (−140° F.), more preferably below about −106° C. (−160° F.), and even more preferably below about −115° C. (−175° F.). In another example welding method, the GMAW process is used to produce a weld metal chemistry comprising iron and about 0.10 wt % carbon (preferably less than about 0.10 wt % carbon, more preferably from about 0.07 to about 0.08 wt % carbon), about 1.60 wt % manganese, about 0.25 wt % silicon, about 1.87 wt % nickel, about 0.87 wt % chromium, about 0.51 wt % molybdenum, less than about 75 ppm phosphorous, and less than about 100 ppm sulfur. The welding heat input is in the range of about 0.3 kJ/mm to about 1.5 kJ/mm (7.6 kJ/inch to 38 kJ/inch) and a preheat of about 100° C. (212° F.) is used. The weld is made on a steel, such as any of the above-described steels, using an argon-based shielding gas with less than about 1 wt % oxygen. Welding by this method provides a weldment having a tensile strength greater than about 900 MPa (130 ksi), preferably greater than about 930 MPa (135 ksi), more preferably greater than about 965 MPa (140 ksi), and even more preferably at least about 1000 MPa (145 ksi). Further, welding by this method provides a weld metal with a DBTT below about −73° C. (−100° F.), preferably below about −96° C. (−140° F.), more preferably below about −106° C. (−160° F.), and even more preferably below about −115° C. (−175° F.). In another example welding method, the tungsten inert gas welding (TIG) process is used to produce a weld metal chemistry containing iron and about 0.07 wt % carbon (preferably less than about 0.07 wt % carbon), about 1.80 wt % manganese, about 0.20 wt % silicon, about 4.00 wt % nickel, about 0.5 wt % chromium, about 0.40 wt % molybdenum, about 0.02 wt % copper, about 0.02 wt % aluminum, about 0.010 wt % titanium, about 0.015 wt % zirconium (Zr), less than about 50 ppm phosphorous, and less than about 30 ppm sulfur. The welding heat input is in the range of about 0.3 kJ/mm to about 1.5 kJ/mm (7.6 kJ/inch to 38 kJ/inch) and a preheat of about 100° C. (212° F.) is used. The weld is made on a steel, such as any of the above-described steels, using an argon-based shielding gas with less than about 1 wt % oxygen. Welding by this method provides a weldment having a tensile strength greater than about 900 MPa (130 ksi), preferably greater than about 930 MPa (135 ksi), more preferably greater than about 965 MPa (140 ksi), and even more preferably at least about 1000 MPa (145 ksi). Further, welding by this method provides a weld metal with a DBTT below about −73° C. (−100° F.), preferably below about −96° C. (−140° F.), more preferably below about −106° C. (−160° F.), and even more preferably below about −115° C. (−175° F.). Similar weld metal chemistries to those mentioned in the examples can be made using either the GMAW or the TIG welding processes. However, the TIG welds are anticipated to have lower impurity content and a more highly refined microstructure than the GMAW welds, and thus improved low temperature toughness.

A person of skill in the art has the requisite knowledge and skill to use the information provided herein to weld materials comprising ultra-high strength, low alloy steel plates to produce joints or seams having suitable high strength and fracture toughness for use in constructing the fuel storage containers and other components of systems of this invention. Other suitable joining or welding methods may exist or be developed hereafter. All such joining or welding methods are within the scope of the present invention.

Construction of Fuel Storage and Delivery System Containers and other Components Fuel storage containers and other components of fuel storage and delivery systems according to this invention are provided. The fuel storage containers and other components are constructed from ultra-high strength, low alloy steels containing less than 2.5 wt % nickel and having a tensile strength greater than 900 MPa (130 ksi). The fuel storage containers and other components of this invention may be constructed from discrete plates of the ultra-high strength, low alloy steel. An added benefit of this invention is that fuel storage containers and other components according to this invention have adequate fracture toughness for use in arctic environments, such as in Siberia and Alaska. The joints or seams of the fuel storage containers and other components preferably have about the same strength and fracture toughness as the ultra-high strength, low alloy steel plates. In some cases, an undermatching of the strength on the order of about 5% to about 10% may be justified for locations of lower stress. Joints or seams with the preferred properties can be made by any suitable joining technique. An exemplary joining technique is described herein, under the subheading "Joining Methods for Construction of Fuel Storage and Delivery System Containers and other Components".

As will be familiar to those skilled in the art, the operating conditions taken into consideration in the design of containers and other components constructed from welded steels and intended for storing pressurized fluids, such as CNG, potentially in arctic environments, i.e., at temperatures down to −40° C. (−40° F.), include among other things, the operating temperature, any pressures, such as fluid pressures, to which the structure will be subjected, as well as additional stresses that are likely to be imposed on the steel and the weldments. Standard fracture mechanics measurements, such as (i) plane strain fracture toughness ($J_C$), and (ii) crack tip opening displacement (CTOD) fracture toughness, both of which are familiar to those skilled in the art, may be used to determine the resistance of fracture initiation in the steel and weldments. Industry codes generally acceptable for steel structure design, for example, as presented in the British Standards Institute publication "Guide on Methods for Assessing the Acceptability of Flaws in Fusion Welded Structures", often referred to as "BS7910:1999", may be used to determine the maximum allowable flaw sizes for the structures based on the fracture toughness of the steel and weldment (including HAZ) and the imposed stresses on the structure. A person skilled in the art can develop a fracture control program to mitigate fracture initiation through (i) appropriate structure design to minimize imposed stresses, (ii) appropriate manufacturing quality control to minimize defects, (iii) appropriate control of life cycle loads and pressures applied to the structure, and (iv) an appropriate inspection program to reliably detect flaws and defects in the structure. A preferred design philosophy for storage containers welded according to the present invention is "leak before failure", as is familiar to those skilled in the art. These considerations are generally referred to herein as "known principles of fracture mechanics."

The following is a non-limiting example of application of these known principles of fracture mechanics in a procedure for calculating critical flaw depth for a given flaw length for use in a fracture control plan to prevent fracture initiation in a pressure vessel or container.

Figure 2A:
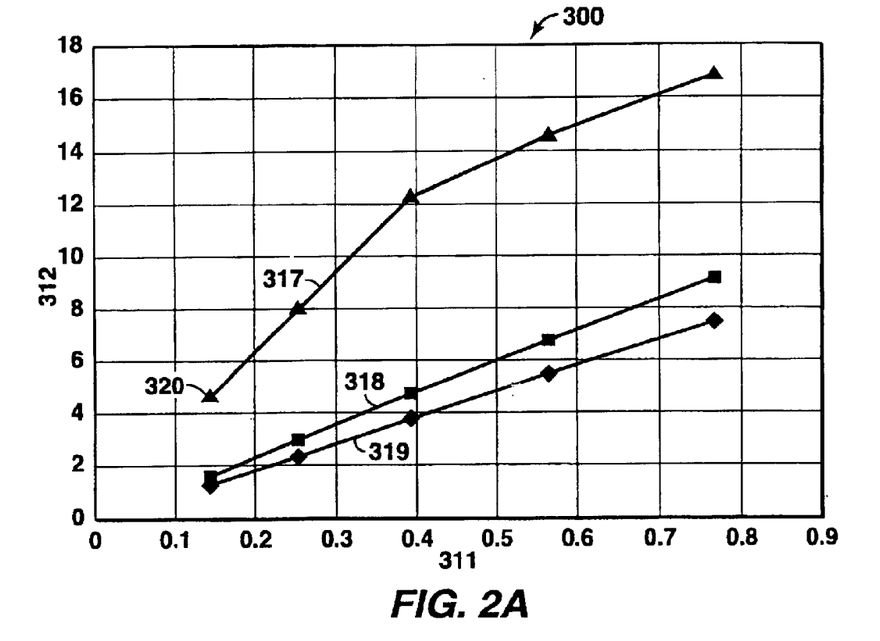
FIG. 2A illustrates a plot of critical flaw depth, for a given flaw length, as a function of plane strain fracture toughness ($J_C$)
Figure 2B:
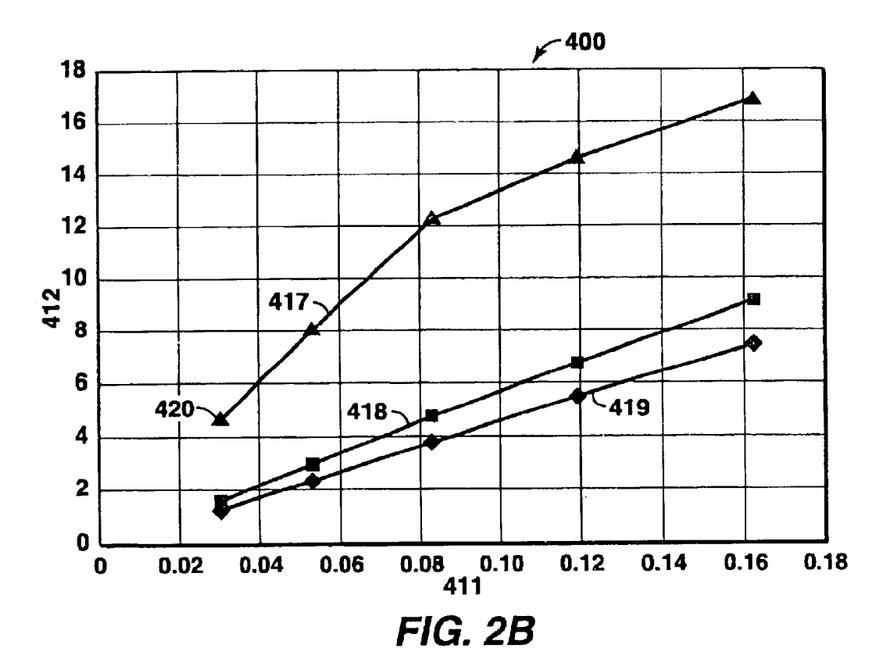
FIG. 2B illustrates a plot of critical flaw depth, for a given flaw length, as a function of CTOD fracture toughness.
Figure 2C:
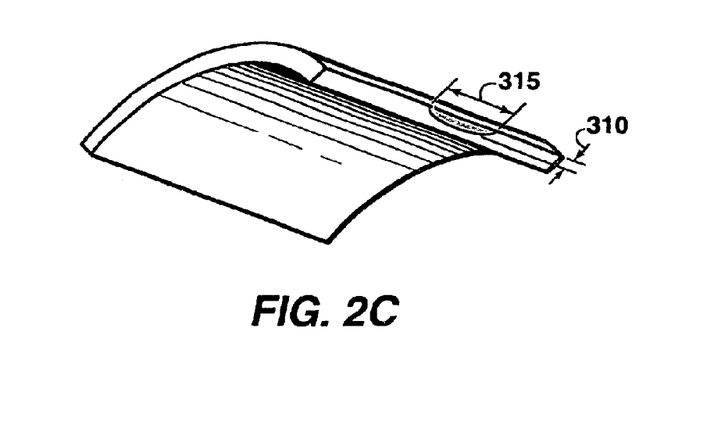
FIG. 2C illustrates the geometry (length and depth) of a flaw.

FIG. 2C illustrates a flaw of flaw length 315 and flaw depth 310. BS7910:1999 is used to calculate values for the critical flaw size plot 300 shown in FIG. 2A ($J_C$) and critical flaw size plot 400 shown in FIG. 2B (CTOD fracture toughness), both based on the following design conditions:

| | |
|---|---|
| Vessel Diameter (outer): | 0.71 m (2.3 ft) |
| Vessel Wall Thickness: | 32.9 mm (1.29 in.) |
| Design Pressure: | 37.5 MPa (5440 psig) |
| Allowable Hoop Stress: | 382 MPa (55.3 ksig). |

For the purpose of this example, a surface flaw length of 100 mm (4 inches), e.g., an axial flaw located in a seam weld, is assumed. Referring now to FIG. 2A, plot 300 shows the value for critical flaw depth in mm, axis 312, as a function of $J_C$ in ksi-inch, axis 311, and of residual stress, for residual stress levels of 15, 50 and 100 percent of yield stress, as illustrated, respectively, by plotted lines 317, 318, and 319. Referring now to FIG. 2B, plot 400 shows the value for critical flaw depth in mm, axis 412, as a function of CTOD fracture toughness in mm, axis 411, and of residual stress, for residual stress levels of 15, 50 and 100 percent of yield stress, as illustrated, respectively, by plotted lines 417, 418, and 419. Residual stresses can be generated due to fabrication and welding; and BS7910:1999 recommends the use of a residual stress value of 100 percent of yield stress in welds (including the weld HAZ) unless the welds are stress relieved using techniques such as post weld heat treatment (PWHT) or mechanical stress relief. This recommendation has been incorporated into the results, i.e., a residual stress value of 100 percent of yield stress was used.

Based on the toughness of the pressure vessel steel at the minimum service temperature, the vessel fabrication can be adjusted to reduce the residual stresses and an inspection program can be implemented (for both initial inspection and in-service inspection) to detect and measure flaws for comparison against critical flaw size. In this example, a toughness of 0.15 ksi-inch ($J_C$) and 0.03 mm (CTOD) at the minimum service temperature (as measured using laboratory specimens), with residual stresses reduced to 15 percent of the steel yield strength, give a value for critical flaw depth of approximately 4.5 mm (see point 320 on FIG. 2A and point 420 on FIG. 2B). Following similar calculation procedures, as are well known to those skilled in the art, critical flaw depths can be determined for various flaw lengths as well as various flaw geometries. Using this information, a quality control program and inspection program (techniques, detectable flaw dimensions, frequency) can be developed to ensure that flaws are detected and remedied prior to reaching the critical flaw depth or prior to the application of the design loads. Based on published empirical correlations between CVN, $K_{JC}$, $J_C$, and CTOD fracture toughness, the 0.015 ksi-inch ($J_C$) and 0.03 mm (CTOD) values generally correlate to a CVN value of about 54 J. This example is not intended to limit this invention in any way.

For containers and other components that require forming of the steel, e.g., into a cylindrical shape for a container or into a tubular shape for a pipe, the steel is preferably formed into the desired shape at ambient temperature in order to avoid detrimentally affecting the properties of the steel. If the steel must be heated to achieve the desired shape during forming, the steel is preferably heated to a temperature no higher than about 600° C. (1112° F.) in order to preserve the beneficial effects of the steel microstructure as described above.

EXAMPLE CNG FUEL STORAGE AND DELIVERY SYSTEM

One embodiment of a fuel storage and delivery system according to this invention for storing CNG fuel and delivering CNG fuel on demand for combustion in a vehicle engine, and the unique advantages associated therewith, is described in detail below. Components of the fuel storage and delivery system, for example, the fuel storage container and vapor lines, are preferably constructed from the low alloy, ultra-high strength steels described herein, or from other steels having the desired characteristics described herein. For components that require forming of the steel, e.g., into a cylindrical shape for a container or into a tubular shape for a pipe, the steel is preferably formed into the desired shape at ambient temperature in order to avoid detrimentally affecting the excellent cryogenic temperature toughness of the steel. If the steel must be heated to achieve the desired shape during forming, the steel is preferably heated to a temperature no higher than about 600° C. (1112° F.) in order to preserve the beneficial effects of the steel microstructure as described above.

Components of Fuel Storage and Delivery System

Figure 1A:
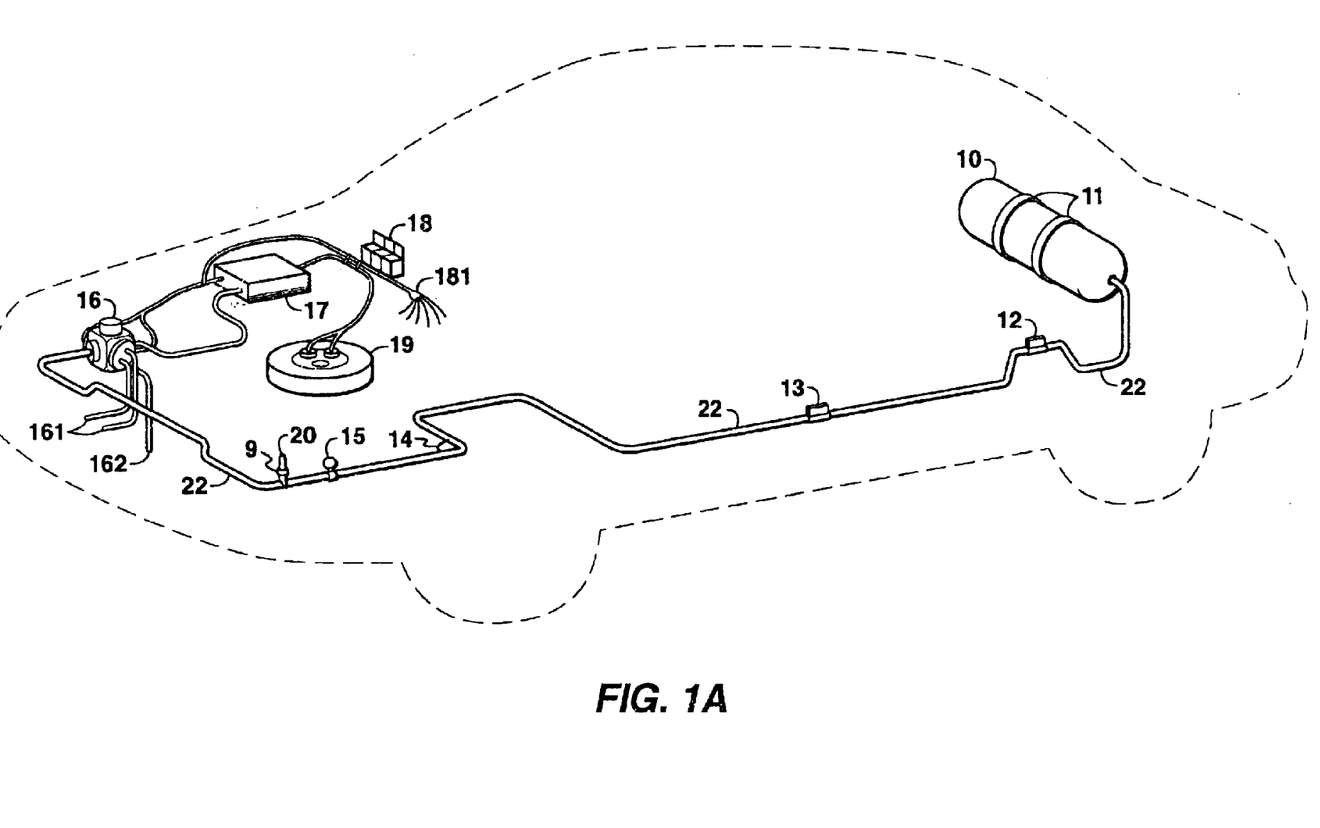
FIG. 1A is a schematic illustration of an embodiment of major components of a CNG fuel storage and delivery system of the present invention.

Referring to FIG. 1A, an example fuel storage and delivery system according to this invention includes a fuel storage container 10. Fuel storage container 10 is preferably constructed from the ultra-high strength, low alloy steels described herein. Fuel storage container 10 may be supported by brackets 11, e.g., in the trunk area of an automobile. Fuel storage container 10 may be supplemented by a vapor bag, shutoff valve, vent tube, and other features (not shown in FIG. 1A) as will be familiar to those skilled in the art. Fuel storage container 10 is connected to fuel fill receptacle 20 through fuel line 22 including fuel lockoff 12, manual shutoff valve 13, vibration loop 14, fuel gauge 15, and check valve 9. After fuel fill receptacle 20, fuel storage container 10 is connected to mixer 19, of any standard engine that is designed to operate through combustion of natural gas, through a continuation of fuel line 22, including fuel regulator 16 and metering valve 17. Fuel shutoff relays 18 are connected to electrical connections 181. Regulator 16 is connected to coolant hoses 161 and vent tube 162.

Figure 1B:
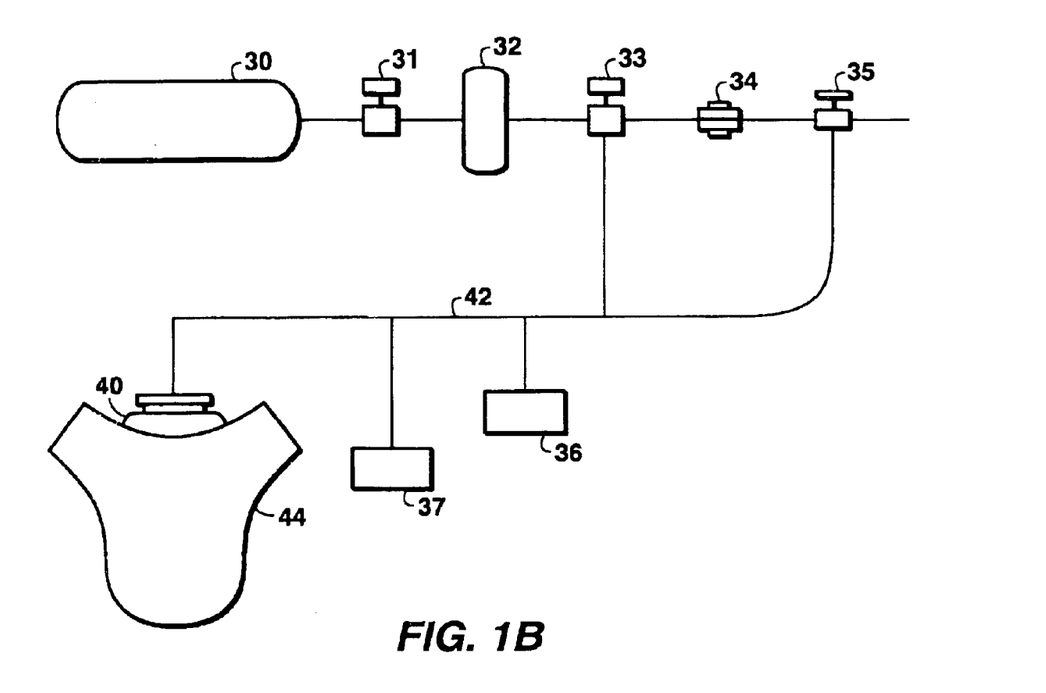
FIG. 1B is a schematic illustration of an embodiment of how a fuel storage and delivery system of the present invention connects to an engine.

Referring now to FIG. 1B, in another example fuel storage and delivery system according to this invention, fuel storage container 30 may be connected to any standard engine 44 that is designed to operate through combustion of natural gas via fuel line 42, including high pressure shut-off solenoid valve 31, high pressure regulator 32, fuel shut-off solenoid 33, fuel regulator 34, mixture control valve 35, NGV system control unit 36, electronic control unit 37, and engine sensor 40.

The systems illustrated in FIG. 1A and FIG. 1B are not intended to limit this invention. The primary focus of systems according to this invention is the novel fuel storage container for storing CNG fuel at pressures of about 20.7 MPa to 37.5 MPa (3000 psia–5440 psia) wherein said fuel storage container is constructed by joining together a plurality of discrete plates of materials comprising an ultra-high strength, low alloy steel containing less than 2.5 wt % nickel and having a tensile strength of at least about 900 MPa (130 ksi), and wherein joints between said discrete plates have adequate strength and toughness at said pressure conditions to contain said compressed natural gas. The remaining components of systems according to this invention may include standard, commercially available components of NGVs, as will be familiar to those skilled in the art. Further, means for operating systems according to this invention are familiar to those skilled in the art.

Comparison of Fuel Storage Containers of this Invention to Current Commercial X-65 CNG Fuel Containers Table 1 (which precedes FIG. 1A) provides data comparing fuel storage containers of this invention to current commercial CNG fuel containers constructed from X-65 steels. Referring to the data in Table 1, two design cases based on this invention are compared to a standard X-65 design. In a first example case, a containment system is designed for the same storage conditions and volume requirements as the standard X-65 design, resulting in a 36% reduction in the containment system weight. See data in the column entitled "Reduced Weight" within the broader column entitled "Example Steel". In particular, see row "y", where it is shown that the weight of the container according to this invention is only 1131 lbs as compared to the 1773 lbs weight of the X-65 container. The reduction in system weight translates to a corresponding increase in payload or an increase in fuel efficiency for the vehicle. In a second example case, the containment system is designed for an increased storage pressure (i.e., 37.5 MPa (5440 psig) but within the same container volume envelope as the X-65 design. See data in the column entitled "Maximum Driving Range" within the broader column entitled "Example Steel". In this second example case, the weight (and therefore the thickness) of the containment system is designed to be the same as that of the X-65 vessel. The increased thickness sets the storage pressure. The increased storage pressure corresponds to an increased fuel storage capacity which translates to increased driving range.

Materials comprising the steels as described herein and the welding metals and methods described herein can be used to construct marine structures suitable for economically producing and processing hydrocarbons for commercial use. These new marine structures can be advantageously used, for example, in the construction of offshore platforms for production of hydrocarbons, such as compliant pile towers and deep draft caisson vessels. Additionally, these marine structures can be used on offshore platforms as processing equipment for containing hydrocarbons and/or other fluids used during the processing. Other marine structures, such as ship hulls, submarine hulls, marine vessel mooring chains, caissons, buoys, bridges, subsea transport lines for fluids, dams, seawalls, and retaining walls, can also be constructed according to this invention. Other items which may be constructed using the materials and methods described herein include, without limitation, other high pressure containers, e.g., for storing inert gases for balloons (stationary and transportable); rocket boosters; other fuel tanks for gasoline, and other fuels; cargo containers; flare stacks; full wellstream production equipment; coiled tubing; rotating equipment shafts; coiled pipe; high pressure compact heat exchangers; cranes; derricks; arctic structures; constrained piping; fittings; sucker rods; supercritical fluid transport lines; armor, including bulletproof armor; pressure vessels and process piping; military tanks; fighter planes; CPT structural materials; heavy machinery; structural steel for use in seismic areas; bridges; tunnels; mining equipment; concrete reinforcements and support members; mooring chains; leak before break vessels; car/train bumpers and side reinforcements; coal slurry pipelines; SCUBA or SCBA tanks; nuclear plant containment vessels; oxygen tanks for aircraft or medical applications; drillpipe; casing; risers; extruded products, e.g., seamless pipe; acoustic liquefaction equipment; boiler plates; supports for process facilities; wheels; linepipe; gun barrels and/or golf clubs.

While the foregoing invention has been described in terms of one or more preferred embodiments, those having normal skill in the art will recognize various changes, modifications, additions and applications other than those specifically mentioned herein that may be made without departing from the scope of the invention, which is set forth in the claims below.

GLOSSARY OF TERMS $Ac_1$ transformation point: the temperature at which austenite begins to form during heating;

$Ar_1$ transformation point: the temperature at which transformation of austenite to ferrite or to ferrite plus cementite is completed during cooling;

$Ar_3$ transformation point: the temperature at which austenite begins to transform to ferrite during cooling;

cooling rate: cooling rate at the center, or substantially at the center, of the plate thickness;

CTOD: crack tip opening displacement;

DBTT (Ductile to Brittle Transition Temperature): delineates the two fracture regimes in structural steels; at temperatures below the DBTT, failure tends to occur by low energy cleavage (brittle) fracture, while at temperatures above the DBTT, failure tends to occur by high energy ductile fracture;

GMAW: gas metal arc welding;

HAZ: heat affected zone;

J: joules;

$J_C$: a measure of plane strain fracture toughness (ASTME 1823);

$K_{IC}$: a measure of plane strain fracture toughness (ASTME 1823);

kJ: kilojoule;

low alloy steel: a steel containing iron and less than about 10 wt % total alloy additives;

maximum allowable flaw size: critical flaw length and depth;

Pcm: a well-known industry term used to express weldability; also, Pcm=(wt % C+wt % Si/30+(wt % Mn+wt % Cu+wt % Cr)/20+wt % Ni/60+wt % Mo/15+wt % V/10+5(wt % B));

ppm: parts-per-million;

predominantly: at least about 50 volume percent;

quenching: accelerated cooling by any means whereby a fluid selected for its tendency to increase the cooling rate of the steel is utilized, as opposed to air cooling;

Quench Stop Temperature: the highest, or substantially the highest, temperature reached at the surface of the plate, after quenching is stopped, because of heat transmitted from the mid-thickness of the plate;

QST: Quench Stop Temperature;

slab: a piece of steel having any dimensions;

tensile strength: in tensile testing, the ratio of maximum load to original cross-sectional area;

TIG welding: tungsten inert gas welding;

$T_{nr}$ temperature: the temperature below which austenite does not recrystallize;

USPTO: United States Patent and Trademark Office;

weld metal: the welding consumable wire (and flux, if used) as deposited and diluted by the portion of the base metal that melts during performance of the welding process or that portion of a weldment that was rendered molten during the welding operation; this volume of material is a mixture of the base metal and the welding consumables; and weldment: a welded joint, including: (i) the weld metal, (ii) the heat-affected zone (HAZ), and (iii) the base metal in the "near vicinity" of the HAZ. The portion of the base metal that is considered within the "near vicinity" of the HAZ, and therefore, a part of the weldment, varies depending on factors known to those skilled in the art, for example, without limitation, the width of the weldment, the size of the item that was welded, the number of weldments required to fabricate the item, and the distance between weldments.

We claim:

1. A fuel storage container suitable for use in a fuel storage and delivery system for storing compressed natural gas fuel at pressures of about 20.7 MPa to 37.5 MPa (3000 psia–5440 psia) and delivering compressed natural gas fuel on demand for combustion in an engine, wherein said fuel storage container is constructed by joining together a plurality of discrete plates of materials comprising an ultra-high strength, low alloy steel containing less than 2.5 wt % nickel and having a tensile strength of at least about 900 MPa (130 ksi), and wherein joints between said discrete plates have adequate strength and toughness at said pressure conditions to contain said compressed natural gas, said joint strength being at least about 90% of the tensile strength of said ultra-high strength, low alloy steel.

2. The fuel storage container of claim 1, wherein said fuel storage container is suitable for use at temperatures down to −0° C. (−40° F.).

3. A fuel storage container suitable for use in a fuel storage and delivery system for storing compressed natural gas fuel at pressures of about 20.7 MPa to 37.5 MPa (3000 psia–5440 psia) and delivering compressed natural gas fuel on demand for combustion in an engine, wherein said fuel storage container is constructed by joining together a plurality of discrete plates of materials comprising an ultra-high strength, low alloy steel containing less than 2.5 wt % nickel and having a tensile strength of at least about 900 MPa (130 ksi), and wherein joints between said discrete plates have adequate strength and toughness at said pressure conditions to contain said compressed natural gas, said joints being formed by a weld metal comprising iron and the following alloying elements in the weight percents indicated:

about 0.04 wt % to about 0.08 wt % carbon;
about 1.0 wt % to about 2.0 wt % manganese;
about 0.2 wt % to about 0.7 wt % silicon;
about 0.30 wt % to 0.80 wt % molybdenum;
about 2.3 wt % to about 3.5 wt % nickel;
about 0.0175 wt % to about 0.0400 wt % oxygen; and
at least one additive selected from the group consisting of (i) up to about 0.04 wt % zirconium, and (ii) up to about 0.02 wt % titanium;
wherein the microstructure of said weld metal comprises from about 5 vol % to about 45 vol % acicular ferrite and at least about 50 vol % lath martensite, degenerate upper bainite, lower bainite, granular bainite, or mixtures thereof.

4. The fuel storage container of claim 3, wherein said fuel storage container is suitable for use at temperatures down to −40° C. (−40° F.).

* * * * *